United States Patent
Uemura et al.

(10) Patent No.: US 6,669,549 B2
(45) Date of Patent: Dec. 30, 2003

(54) VENTILATION CONTROLLING APPARATUS AND AUTOMOTIVE AIR-CONDITIONING SYSTEM

(75) Inventors: Yukio Uemura, Nagoya (JP); Masaharu Yamazaki, Kariya (JP); Noriyoshi Miyajima, Nukata-gun (JP); Tomohide Shindo, Kariya (JP); Koji Ito, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/171,194

(22) Filed: Jun. 12, 2002

(65) Prior Publication Data

US 2002/0197951 A1 Dec. 26, 2002

(30) Foreign Application Priority Data

Jun. 22, 2001 (JP) ........................... 2001-190306
Dec. 18, 2001 (JP) ........................... 2001-384827

(51) Int. Cl.⁷ .............................................. B60H 1/00
(52) U.S. Cl. ..................... 454/156; 454/159; 454/160
(58) Field of Search ................. 454/121, 156, 454/159, 160, 161; 251/901; 165/42, 43

(56) References Cited

U.S. PATENT DOCUMENTS

| 6,351,961 B1 | * | 3/2002 | Kurokawa et al. ............. 62/244 |
| 6,508,703 B1 | * | 1/2003 | Uemura et al. ............. 454/156 |
| 6,569,009 B2 | * | 5/2003 | Nishikawa et al. ......... 454/121 |
| 2002/0009968 A1 | * | 1/2002 | Tsurushima et al. ........ 454/121 |

FOREIGN PATENT DOCUMENTS

JP          A8-2238          1/1996

* cited by examiner

Primary Examiner—Harold Joyce
(74) Attorney, Agent, or Firm—Harness, Dickey & Pierce, PLC

(57) ABSTRACT

A ventilation controlling apparatus using a slide door made of a flexible film member to solve imperfect slide action attributable to film member rigidity degradation on the fringe of an aperture. The slide door is movably disposed inside a casing which forms an air passage, and the slide door is composed of the flexible film member provided with an air-circulation aperture. Ventilation of the air passage is controlled by varying an area of blending or connection between the aperture and the air passage in accordance with movement of the slide door. A rigid support member is fitted around the fringe of the aperture on the film member, thereby enhancing rigidity of the aperture fringe.

6 Claims, 7 Drawing Sheets

VENTILATION CONTROLLING APPARATUS AND AUTOMOTIVE AIR-CONDITIONING SYSTEM

CROSS REFERENCE TO RELATED APPLICATION

This application is based upon, and claims the benefit of priority of, prior Japanese Patent Applications No. 2001-19030, filed on Jun. 22, 2001, and No. 2001-384827, filed Dec. 18, 2001.

BACKGROUND OF THE INVENTION

1. Field of the Invention

The present invention relates to a ventilation controlling apparatus for opening and closing air passages with a slide door made of a flexible film member, and to an automotive air-conditioning system using the ventilation controlling apparatus.

2. Description of the Related Art

Conventional ventilation controlling apparatuses for switching air passages by movement of film members have been disclosed, as in Japanese Patent Laid-Open Publication No. Hei. 8-2238. A typical ventilation controlling apparatus in the prior art has a construction in which both ends of the film member are severally joined to a driving shaft and to a driven shaft for winding purposes. Accordingly, the driving shaft and the driven shaft need to interlock. For this reason, such a ventilation controlling apparatus requires an interlocking mechanism including pulleys, wires and the like, causing the entire apparatus to involve numerous component items and a complicated assembly. As a result, the conventional ventilation controlling apparatuses incur cost increases.

In consideration thereof, the applicant of the present invention has already proposed a ventilation controlling apparatus with a simplified construction in Japanese Patent Application No. 2000-275306, in which a mechanism for winding a film member is curtailed. In this prior application, guide portions are provided inside a casing which forms air passages. The guide portions guide both ends in a width direction of the film member (corresponding to a slide door in the present invention), and a driving gear of a driving shaft is engaged with the film member.

Accordingly, the film member reciprocates along the guide members by rotation of the driving shaft, whereby the air passages of the casing are opened or closed by means of motion of the film member. To be more precise, an air-circulation aperture is provided on the film member and motion of the film member varies an area of connection between the aperture and the air passages on the casing and thereby opens or closes the air passages.

However, when the technique of the prior application is embodied into test production, since the film member is provided with the air-circulation aperture, rigidity of the film member is degraded on a fringe of the aperture. As a result, the film member on the fringe of the aperture is deformed when controlling force is applied from the driving gear of the driving shaft. Therefore, it is difficult to thrust the film member smoothly forward.

SUMMARY OF THE INVENTION

In consideration of the foregoing problem, it is an object of the present invention to solve imperfect action of a ventilation controlling apparatus using a slide door made of a flexible film member, wherein such imperfect action is attributable to degradation of rigidity of the film member on the fringe of an aperture.

To achieve the object, a first aspect of the present invention is a ventilation controlling apparatus including: a casing for forming an air passage; a slide door movably disposed inside the casing, the slide door being composed of a flexible film member provided with an air-circulation aperture thereon; and rigidity increasing means for increasing rigidity of a fringe of the aperture on the film member. Here, ventilation of the air passage is controlled by varying an area of connection between the aperture and the air passage in accordance with movement of the slide door.

In this way, even if the film member of the slide door includes the aperture, it is possible to increase rigidity of the aperture fringe on the film member. Therefore, upon application of a driving force in a thrusting direction toward the film member, it is possible to thrust the film member in the thrusting direction by the driving force. Accordingly, it is possible to reliably move the slide door with a simple door operation mechanism without requiring a winder mechanism for the film member.

A second aspect of the present invention is the ventilation controlling apparatus according to the first aspect, in which the rigidity increasing means and the film member are separately formed.

A third aspect of the present invention is the ventilation controlling apparatus according to the second aspect, in which the separate rigidity increasing means is a support member having higher rigidity than the film member. Here, the support member is formed into a frame shape to effectuate air circulation through the aperture on the film member. Moreover, the support member is fitted to the aperture fringe of the film member so as to move integrally with the film member. In this way, it is possible to increase rigidity of the aperture fringe of the film member by use of the frame-shaped support member.

A fourth aspect of the present invention is the ventilation controlling apparatus according to the second aspect, in which the separate rigidity increasing means is a reinforcing film member provided with an aperture connected to the aperture provided on the film member, and the reinforcing film member is adhered to the aperture fringe of the film member. In this way, it is possible to construct the rigidity increasing means as a thin integral structure with the film member, in contrast to the third aspect.

A fifth embodiment of the present invention is the ventilation controlling apparatus according to the first embodiment, in which the rigidity increasing means adopts construction as a reinforcing portion integrally formed on the aperture fringe of the film member to increase a thickness of the aperture fringe thicker than other portions of the film member without provision of the air-circulation aperture. In this way, the rigidity increasing means can be easily formed on the film member by integrally molding.

A sixth embodiment of the present invention is the ventilation controlling apparatus according to any one of the first to the fourth embodiments, in which the aperture fringe is located in a central position in a moving direction 'a' of the film member, and film portions, without the air-circulation aperture, are located at both front and back sides in the moving direction 'a' with respect to the aperture fringe. In this way, the air passage can be controlled by a combination of the aperture on the film member in the central position in the moving direction and the film portions on both sides in the moving direction. Accordingly, it is possible to broaden objects of controllable air passages.

A seventh embodiment of the present invention is the ventilation controlling apparatus according to any one of the first to the sixth embodiments, in which a controlling force from the driving means is transferred to the film member via a region of the rigidity increasing means to move the film member. In this way, it is possible to transfer the controlling force from the driving means to the film member via a highly rigid undeformable portion (the region of the rigidity increasing means).

An eighth embodiment of the present invention is the ventilation controlling apparatus according to any one of the first to the seventh embodiments, in which the rigidity increasing means is disposed on the film member at an upwind side. Hence, the ventilation controlling apparatus is advantageous because the rigidity increasing means does not interfere with a sealing action when the film member at a downwind side and a sealing surface of the casing collectively exerts such a sealing action.

A ninth embodiment of the present invention is a ventilation controlling apparatus including: a casing for forming an air passage; and a slide door movably disposed inside the casing. Here, the slide door includes a frame-shaped rigid support member provided with an air-circulatable aperture, and a film member joined to an edge in a moving direction of the support member. Moreover, the support member is moved integrally with the film member by applying a door-controlling force to the support member.

In this way, it is possible to move the film member by applying the door-controlling force to the frame-shaped rigid support member provided with the air-circulatable aperture. Therefore, an air-circulation aperture is not required on the film member, thereby solving a problem of deformation of the film member at an aperture fringe. Accordingly, it is possible to smoothly thrust the film member and thereby reliably operate the slide door.

In addition, according to the ninth embodiment, the air-circulation aperture need not be provided on the film member as described above. Therefore, it is possible to eliminate wastes derived from die cutting in forming an aperture, to thereby reduce material costs for the film member.

Meanwhile, upon forming the air-circulation aperture on the film member, some width is provided for a slender zonal portion around the aperture in order to secure its strength. Consequently, an apertural area of the air-circulation aperture is narrowed and ventilation resistance is thereby increased. However, according to the ninth embodiment, the air-circulation aperture is formed on the frame-shaped rigid support member, and the frame-shaped support member has much greater strength than the film member. Therefore, it is possible to increase the apertural area of the air-circulation aperture on the support member considerably more than merely providing the aperture on the film member. This effectively decreases the ventilation resistance.

A tenth embodiment of the present invention is the ventilation controlling apparatus according to the ninth embodiment, in which the film members are joined to both front and back ends in a moving direction of the support member.

An eleventh embodiment of the present invention is the ventilation controlling apparatus according to the tenth embodiment, in which the both film members have an identical shape. In this way, it is possible to avoid erroneous fitting of the film members such as back-to-front installations.

A twelfth embodiment of the present invention is the ventilation controlling apparatus according to any one of the ninth to the eleventh embodiments, in which the support member includes a retention pin, the film member includes a retention hole to be retained on the retention pin, and the film member is joined to the support member by retaining the retention pin on the retention hole.

In this way, it is possible to reliably join the film member to the support member with a mechanical retention structure composed of the retention pin and the retention hole, thereby preventing the film member from detaching.

A thirteenth embodiment of the present invention is an automotive air-conditioning system including a heater core for heating air to flow into a passenger compartment, a bypass passage for allowing the air to bypass the heater core, and an air-mix door for adjusting proportions between a volume of the air passing through the heater core and a volume of the air passing through the bypass passage. Here, the air-mix door is composed of the slide door according to any one of the first to the twelfth embodiments. In this way, the automotive air-conditioning system of the air mixing type enables cool air and warm air to pass adjacently through the aperture of the air-mix door as will be described later with reference to FIG. 5B. Hence, the automotive air-conditioning system can improve performance for mixing the cool air and the warm air as compared to another example to be described with reference to FIG. 5A, thereby reducing unevenness of the air temperature flowing into the passenger compartment.

A fourteenth embodiment of the present invention is an automotive air-conditioning system including a plurality of air outlet apertures to blow out temperature-conditioned air into multiple regions of a passenger compartment, and a blower mode selection door for opening and closing the plurality of air outlet apertures. Here, the blower mode selection door adopts the slide door according to any one of the first to the twelfth embodiments. In this way, the slide door according to the present invention can be embodied in the blower mode selection door for the automotive air-conditioning system as well.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS (First Embodiment)

Figure 1:
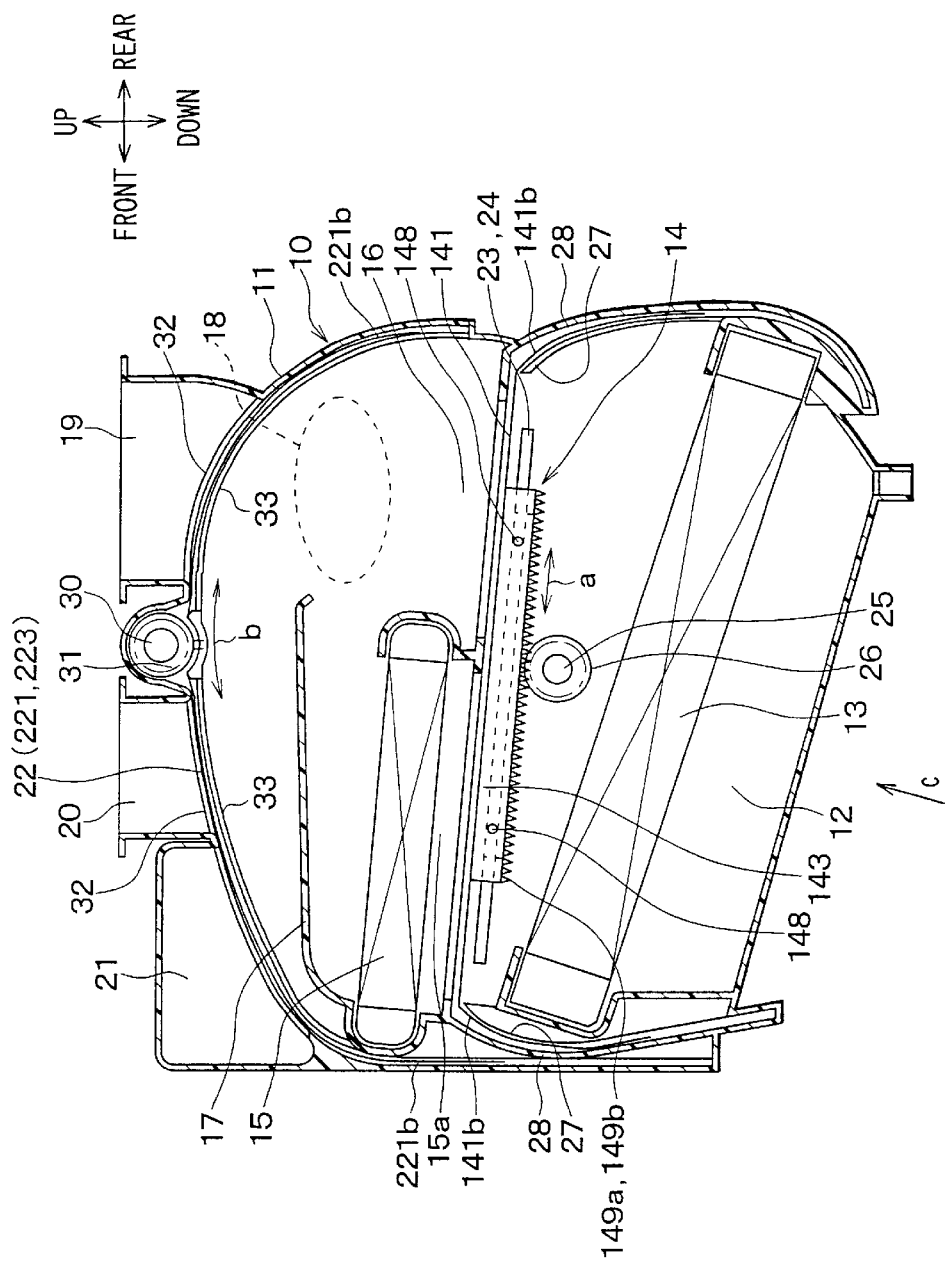
FIG. 1 is a cross-sectional view of an air-conditioning unit according to a first embodiment of the present invention.

FIG. 1 illustrates an interior air-conditioning unit 10 for an automotive air-conditioning system adopted in a first embodiment of the present invention. The air-conditioning unit 10 houses a heat exchange unit. The air-conditioning unit 10 is disposed almost centrally in the left-to-right (width) direction of a vehicle and behind an instrument panel (not shown) installed in the front of a passenger compartment. Arrows pointing vertically (up and down) and horizontally (front and rear) in FIG. 1 indicate directions within the vehicle when the air-conditioning unit 10 is installed. The interior unit of the automotive air-conditioning, system is roughly divided into the above-mentioned air-conditioning unit 10 disposed in the central position and an unillustrated blower unit located behind the instrument panel on the side of the vehicle opposite the driver.

The blower unit includes an air switch box for switching and introducing outside air (the air outside the passenger compartment) or inside air (the air inside the passenger compartment), and a blower for blowing the air which is introduced into the air switch box. The air from the blower unit flows into an air influx space 12 at the bottom of the casing 11 of the air-conditioning unit 10.

The casing 11 is made of an elastic and mechanically strong resin such as polypropylene. To be more precise, the casing 11 is composed of a plurality of partial casing components which are molded and incorporated. It is primarily due to reasons such as convenience for die-releasing upon formation, convenience for fitting air-conditioning instruments inside the casing, and so on.

Above the air influx space 12 inside the casing 11 of the air-conditioning unit 10, and an evaporator 13 is disposed approximately horizontally, that is, inclined to a small degree. The evaporator 13 constitutes a heat exchanger for cooling. Accordingly, the air from the blower unit first flows into the air influx space 12 and then passes through the evaporator 13 from the bottom up as indicated by the arrow 'c'. As it is publicly known, low-pressure refrigerant flows into the evaporator 13. A decompressor, such as an expansion valve of an automotive air-conditioning refrigeration cycle, decompresses the refrigerant, and the low-pressure refrigerant absorbs the heat from the flowing air and thereby evaporates.

Moreover, an air-mixing slide door 14, which is made of a film member, is disposed above the evaporator 13 (on a downstream side of the air). In addition, a hot-water heater core 15 is disposed above the air-mixing slide door 14 (on a further downstream side of the air). As it is publicly known, the heater core 15 is a heat exchanger for heating, which heats the air by use of hot water coming from an engine (i.e. engine coolant).

The heater core 15 is disposed almost horizontally as well. However, the heater core 15 is smaller than a cross-sectional area of a passage inside the casing 11 and is disposed lopsidedly toward the front of the vehicle within the casing 11. In this way, a bypass passage 16 is formed behind the heater core 15 toward the rear of the vehicle so that the air can bypass the heater core 15.

The air-mixing slide door 14 moves (reciprocates) in a back-and-forth direction (as illustrated with arrow 'a') of the vehicle in a space between the evaporator 13 and the heater core 15, whereby adjusting proportions of volumes of the warm air passing through an air passage 15a (a warm air passage) of the heater core 15 and the cool air passing through the bypass passage 16. Such an adjustment of the volumetric proportions between the warm air and the cool air controls the temperature of the air flowing into the passenger compartment. Thus, the air-mixing slide door 14 constitutes a means for adjusting the temperature of the air flowing into the passenger compartment.

The warm air, which has passed through the heater core 15, is guided toward the rear of the vehicle by a warm air guide wall 17 and is thereby headed to an air-blending portion 18. The cool air from the bypass passage 16 and the warm air passed through the heater core are blended in the air-blending portion 18, whereby the air is set to a desired temperature.

On an upper face of the casing 11 (a downstream end of the air), a plurality of air outlet apertures, namely, a face aperture 19, a defroster aperture 20 and a foot aperture 21, are provided serially from the rear to the front of the vehicle. The face aperture 19 is provided for blowing the conditioned air from the air-blending portion 18 to the upper body of a passenger. The defroster aperture 20 is provided for blowing the conditioned air from the air-blending portion 18 to an inside surface of a windshield of the vehicle. Further, the foot aperture 21 is provided for blowing the conditioned air from the air-blending portion 18 toward the feet of a passenger. The plurality of air outlet apertures 19, 20 and 21 are opened and closed with a blower mode selection slide door 22 composed of a single film member, which moves (reciprocates) in a back-and-forth direction of the vehicle as illustrated with an arrow 'b'.

The air-mixing slide door 14 and the blower mode selection slide door 22 are both designed to reciprocate along curved paths inside the casing 11 as shown in FIG. 1. Therefore, the air-mixing slide door 14 and the blower mode selection slide door 22 are made of flexible film members (such as plastic film) 141 and 221 so as to be deformable in response to the curved paths. In particular, polyethylene terephthalate (PET) films are the preferred material for the film members 141 and 221, because PET has flexibility as well as small frictional resistance.

The thickness of the film members 141 and 221 is very small as in a range from some 100 to 250 μm, for example. By setting the thickness of the film members within that range, the film can be easily deformed in response to the curved portions along the reciprocation paths while maintaining sufficient rigidity for thrusting the slide door 14 or 22. In this way, a substantial increase of controlling force attributable to bending force is suppressed.

Figure 2A:
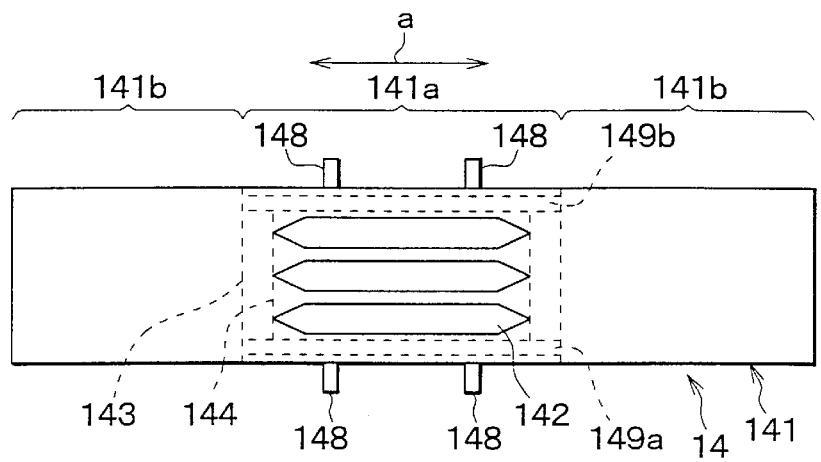
FIG. 2A is a front view of an air-mixing slide door according to the first embodiment.
Figure 2B:
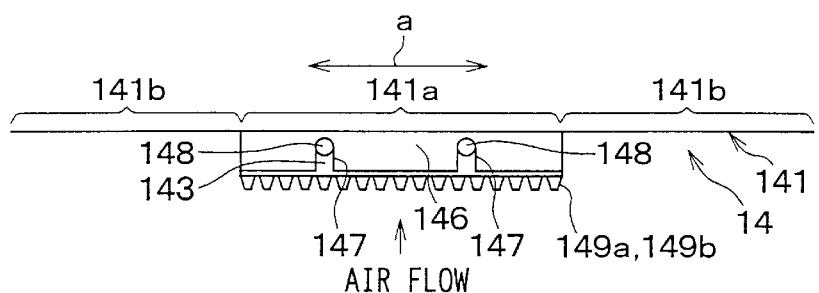
FIG. 2B is a side view of the air-mixing slide door according to the first embodiment.
Figure 2C:
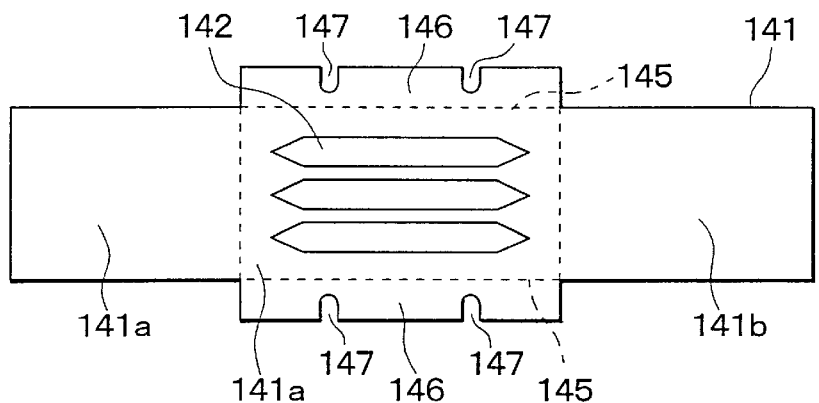
FIG. 2C is a view of a single body of a film member in the air-mixing slide door according to the first embodiment.

Next, description will be made of the air-mixing slide door 14. FIGS. 2A to 2C are views for exemplifying a typical construction of a single body of the air-mixing slide door 14. The door 14 includes a rectangular film member 141, and a plurality of air-circulation apertures 142 are provided in a central region in the longitudinal direction (a moving direction of the door as illustrated with an arrow 'a')

of the film member 141. Moreover, both front and rear ends, that is, leading and trailing portions, in the door moving direction 'a' of the film member 141 beside an aperture fringe 141a constitute portions without the air-circulation apertures (film portions) 141b.

Rigidity increasing means is provided in order to enhance rigidity of the aperture fringe 141a of the film member 141. In the example in FIGS. 2A to 2C, the rigidity increasing means is composed of a support member 143, which is a rigid member separate from the film member 141. The support member 143 is a frame-shaped rigid member which includes one aperture 144 (see FIG. 3) disposed in the central position thereof. The aperture 144 has an apertural area which covers the whole aperture region of the plurality of apertures 142. Such a support member 143 may be made of resin such as polypropylene.

Bent portions 146 are provided on both sides in the width direction at the aperture fringe 141a in the central position in the door moving direction 'a' of the film member 141. The bent portions 146 are bent along lines 145. Further, two pin inserting portions 147 of U-shaped grooves are provided on each of the bent portions 146 on both sides in the width direction. Although the pin inserting portions 147 are formed into grooves in the drawing, they may also be formed into oval holes or slots.

Figure 3:
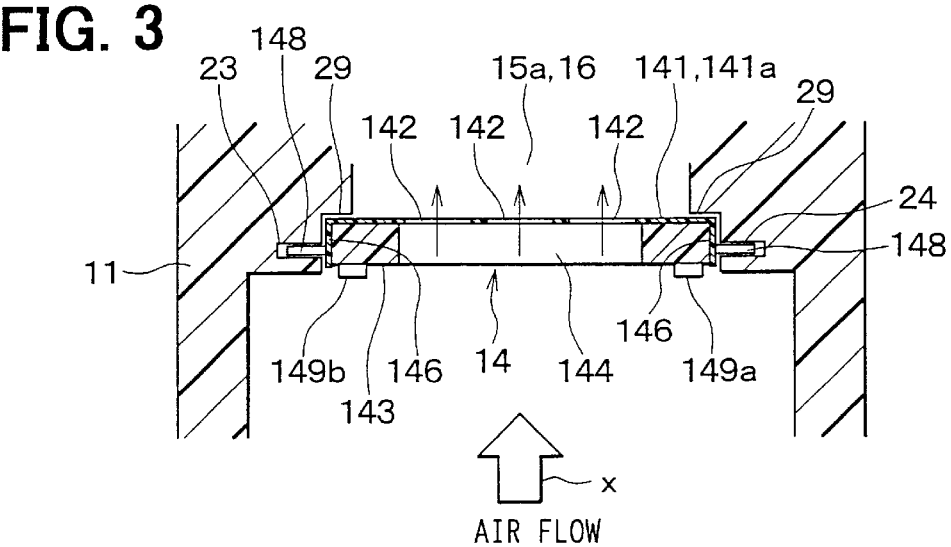
FIG. 3 is a cross-sectional view of an engaging support between the air-mixing slide door and a casing according to the first embodiment.

As shown in FIG. 3, the aperture fringe 141a of the film member 141 is formed into the U-shape together with the bent portions 146 so as to cover the support member 143. Moreover, two guide pins 148 are integrally formed on each side face in the width direction of the support member 143 so as to protrude perpendicularly to the door moving direction 'a'. Each of the guide pins 148 is inserted into each of the pin inserting portions 147 on the bent portions 146 of the film member 141. In this way, it is possible to retain the film member 141 and the support member 143 integrally with respect to the moving direction 'a' of the film member 141.

Meanwhile, on the casing 11 of the air-conditioning unit 10 horizontal guide grooves 23 and 24 (see FIG. 3), which extend parallel to the door moving direction 'a', are provided on both right and left sides of an inner wall face below the air passage (the warm air passage) 15a of the heater core 15 and also below the bypass passage 16. The guide pins 148 are slidably inserted into the guide grooves 23 and 24. In this way, the entire slide door 14 including the film member 141 and the support member 143 is held on the right and left sides of the inner wall face of the casing 11 as slidable in the back-and-forth direction 'a' of the vehicle by engagement of the guide pins 148 and the guide grooves 23 and 24.

In addition to the function as the rigidity increasing means, the support member 143 also functions to transfer controlling force (driving force) to the film member 141. For this reason, linear gears (racks) 149a and 149b, which extend parallel to the door moving direction 'a', are integrally formed on a lower face (the face opposite with the film member 141) of the support member 143. The linear gears 149a and 149b are formed on both right and left sides in the width direction on the lower face of the support member 143.

As shown in FIG. 1, in an intermediate region between the air passage 15a of the heater core 15 and the bypass passage 16 inside the casing 11 immediately below the slide door 14 (i.e. the intermediate region in the back-and-forth direction of the vehicle inside the casing 11), a door driving shaft 25 is disposed perpendicularly to the door moving direction 'a' (in the right-to-left direction of the vehicle). Both end portions in the axial direction of the driving shaft 25 are rotatably supported by bearing holes (not shown), which are provided on the wall face of the casing 11. On the driving shaft 25, circular-driving gears (pinions) 26 are integrally formed of resin on regions corresponding to the linear gears 149a and 149b (i.e. regions on the both sides in the axial direction), whereby the driving gears 26 are engaged with the linear gears 149a and 149b.

Moreover, one end in the axial direction of the driving shaft 25 protrudes out of the casing 11, and the protruded end of the driving shaft 25 is joined via an appropriate interlocking mechanism to an output shaft of a servomotor (not shown), which constitutes a door driving unit. In this way, rotation of the servomotor is transferred to the driving shaft 25, and rotation of the driving shaft 25 is further converted into reciprocation of the slide door 14 by engagement of the driving gears 26 and the linear gears 149a and 149b.

As it can be understood from a configuration layout in FIG. 1, of the film member 141 of the slide door 14, the aperture fringe 141a located in the central position in the door moving direction 'a' and the support member 143 move linearly in the back-and-forth direction of the vehicle in response to reciprocation of the slide door 14. On the contrary, of the film member 141, the film portions 141b without the aperture, which are located on both, the front and back sides in the door moving direction 'a', are guided by guide portions 27 and 28 integrally formed on the wall of the casing 11 and thereby reciprocate along curved paths.

In other words, both right and left ends in the width direction (a perpendicular direction to the sheet surface of FIG. 1) of the film portions 141b without the aperture are inserted slidably into groove spaces between the guide portions 27 and 28, thereby guiding movement of the film portions 141b.

Meanwhile, when the slide door 14 is fitted in the casing 11 (as shown in FIG. 3), the support member 143 is located in an upwind position and the film member 141 is located in a downwind position. The support member 143 holds the film member 141 only in the door moving direction 'a', so that the film member 141 is not restricted to move in the direction of airflow arrow 'x' in FIG. 3. Therefore, upon receipt of air pressure, the film member 141 moves toward a downwind side and a surface of the film member 141 is attached by pressure to a sealing surface 29, which is formed on the casing 11. In other words, the film member 141 is held between the support member 143 and the sealing surface 29 on the casing 11, displaceable by only a small amount.

Next, description will be made regarding a typical example of the blower mode selection slide door 22 with reference to FIGS. 4A and 4B. A film member 221 of the blower mode selection slide door 22 is also provided with a plurality of air-circulation apertures 222 being partitioned in a central position in a moving direction 'b' thereof. Film portions 221b without air-circulation apertures are formed on front and rear sides beside an aperture fringe 221a in the central position of the film member 221. Moreover, a reinforcing film member 223, which is separate from the film member 221, is attached and fixed (adhered) integrally to the film member 221 as a rigidity increasing means for the aperture fringe 221a.

The reinforcing film member 223 is provided with apertures 224, which are identical in shape to the apertures 222 on the film member 221. Therefore, air can circulate through the apertures 222 and 224.

The reinforcing film member 223 is formed thicker (0.2 to 10 mm, for example) than the film member 221 (100 to 250 $\mu$m, for example), thereby increasing the rigidity of the aperture fringe 221a of the film member 221 supported by the reinforcing film member 223 more than that of the film members 221b without the apertures. A specific material for the reinforcing film member 223 is selected in light of mechanical strength and adhesion performance to the film member 221, and preferred examples of the reinforcing film member 223 include resin such as polybutylene terephthalate (PBT) or polypropylene (PP).

In the vicinities of both ends in the width direction of the aperture fringe 221a of the film member 221 and the reinforcing film member 223, gear-engaging perforations 225 and 226 are provided so as to penetrate both members. Meanwhile, in an intermediate region between the face aperture 19 and the defroster aperture 20 located on the upper face of the casing 11 and in a position above the blower mode selection slide door 22, a drive shaft 30 is disposed perpendicularly to the door moving direction 'b' (i.e. the right-to-left direction of the vehicle).

Both end portions in the axial direction of the drive shaft 30 are rotatably supported by bearing holes (not shown), which are provided on the wall face of the casing 11. On the drive shaft 30, drive gears 31 are integrally formed of resin on regions corresponding to the perforations 225 and 226 (i.e. regions on both sides in the axial-direction), whereby teeth of the driving gears 31 are engaged with the perforations 225 and 226 of the film members 221 and 223.

Moreover, one end in the axial direction of the driving shaft 30 protrudes out of the casing 11, and the protruded end of the drive shaft 30 is joined via an appropriate interlocking mechanism to an output shaft of a servomotor (not shown), which constitutes a door driving unit. In this way, rotation of the servomotor is transferred to the drive shaft 30, and rotation of the drive shaft 30 is further converted into reciprocation of the slide door 22 by engagement of the driving gears 31 and the perforations 225 and 226.

In order to reciprocate the film members 221 and 223 along curved paths inside the casing 11, guide portions 32 and 33 are provided on the inner wall face of the casing 11 by integral molding or the like. Both ends in the width direction of the film members 221 and 223 are inserted into groove spaces between the guide portions 32 and 33, thereby guiding the film members 221 and 223. The guide members 32 and 33 are formed throughout reciprocation paths of the slide door 22 (the film member 221) except in the region of the drive shaft 30.

Figure 4A:
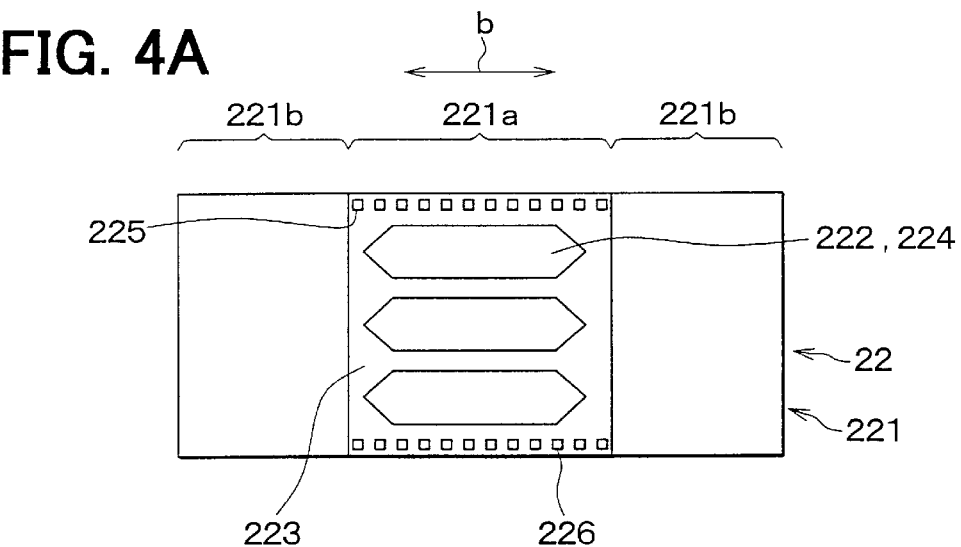
FIG. 4A is a front view of a blower mode selection slide door according to the first embodiment.
Figure 4B:
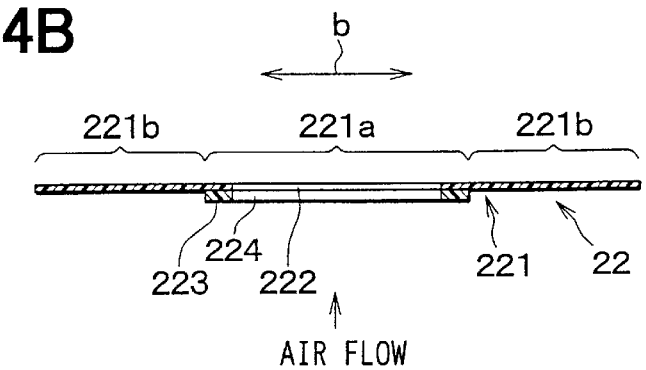
FIG. 4B is a cross-sectional view of the blower mode selection slide door according to the first embodiment.

When the slide door 22 is fitted in the casing 11 as shown in FIG. 1, the reinforcing film member 223 is located in an upwind position and the film member 221 is located in a downwind position as shown in FIG. 4B. Peripheries of the gear-engaging perforations 225 and 226 on both ends in the width direction of the film members 221 and 223 are placed inside the groove spaces of the guide portions 32 and 33 and are adhered to a surface of the guide portion 32 on the downwind side. Therefore, the perforations 225 and 226 do not incur air leakage.

Next, an operation of an automotive air-conditioning system according to the first embodiment will be described. The air-mixing slide door 14 reciprocates in the back-and-forth direction 'a' of the vehicle, thereby changing an apertural area which is defined by the aperture 142 on the film member 141 of the slide door 14, the air passage 15a of the heater core 15 and the bypass passage 16. Hence, the cool air from the cool air bypass passage 16 and the warm air through the heater core 15 are blended in a certain proportion, and thus a desired temperature becomes obtainable upon blowing the air.

In a maximum cooling mode, the film portion 141b without the aperture of the film member 141 of the air-mixing slide door 14 entirely closes the air passage 15a of the heater core 15. Additionally, the aperture 142 on the film member 141 of the slide door 14 coincides with the bypass passage 16, thereby the bypass passage 16 is fully opened. At a maximum heating mode, the aperture 142 of the film member 141 of the slide door 14 coincides with the air passage 15a of the heater core 15 so that the air passage 15a is fully opened. Additionally, the film portion 141b without the aperture of the film member 141 of the air-mixing slide door 14 entirely closes the bypass passage 16.

On the other hand, regarding the blower mode selection slide door 22, the film member 221 reciprocates in the back-and-forth direction 'b' of the vehicle to switch ventilation through the face aperture 19, the defroster aperture 20 and the foot aperture 21. In this way, the blower mode selection slide door 22 can change ventilation into well-known blower modes; namely, a face mode, a bi-level mode, a foot mode, a foot-defroster mode, a defroster mode, and others.

Incidentally, as shown in FIG. 1, the drive shafts 25 and 30 are disposed on respective positions in the moving direction (the back-and-forth direction of the vehicle) 'a' and 'b' of the air-mixing slide door 14 and the blower mode selection slide door 22 inside the casing 11, respectively. Then, each of the slide doors 14 and 22 reciprocates with the driving force transferred from the driving gears 26 of drive shaft 25, or driving gear 31 of drive shaft 30. As a result, both ends in the moving direction 'a' of the film member 141 of the slide door 14 and both ends in the moving direction 'b', of the film member 221 of the slide door 22 are not joined to winder mechanisms but constitute free ends.

Due to the driving mode as described above, pulling forces from the drive shaft 25 or 30 act on the film member 141 or 221, of slide doors 14 or 22 at a region behind drive shaft 25 or 30 in the moving direction 'a' or 'b'. Moreover, a pushing force from the driving shaft 25 or 30 acts on the film member 141 or 221 at a region ahead of the driving shaft 25 or 30 in the moving direction 'a' or 'b', causing the film members 141 and 221 to move accordingly. For this reason, the film member 141 or 221 needs to be rigid so that it can move along the guide portions 27 and 28 or the guide portions 32 and 33 in response to the pushing force.

Nevertheless, the large air-circulation apertures 142 and 222 are provided in the central positions in the moving direction 'a' and 'b' on the film members 141 and 221 of both slide doors 14 and 22. If no remedies are provided, then rigidity at the aperture fringe 141a or 221a is substantially degraded in comparison with rigidity at the film portions 141b or 221b without the aperture.

Therefore, in the first embodiment, the above-described rigidity increasing means is provided on each of the film members 141 and 221 of the slide doors 14 and 22. In other words, regarding the air-mixing slide door 14, the frame-shaped rigid support member 143 is fitted to the aperture fringe 141a of the film member 141, so that the support member 143 and the aperture fringe 141a reciprocate integrally. Therefore, it is possible to increase rigidity at the aperture fringe 141a of the film member 14 almost up to the support member 143.

In addition, since the driving force is transferred from the drive shaft 25 and the driving gears 26 to the support member 143 so as to integrally reciprocate the support member 143 and the film member 141, the support member 143 will prevent deformation of the aperture fringe 141a of the film member 14 caused by the pushing force applied when the driving force pushes the film member 141. Accordingly, it is possible for the film member 141 to reliably proceed upon application of the pushing force.

Similarly, regarding the blower mode selection slide door 22, the separate reinforcing film member 223 is adhered to the aperture fringe 221a provided in the central position in the moving direction 'b' of the film member 221, whereby rigidity at the aperture fringe 221a of the film member 221 can be increased up to a higher level than rigidity at the film portions 221b without the aperture. Therefore, the reinforcing film member 223 can surely prevent deformation of the aperture fringe 221a of the film member 221 attributable to the pushing force applied when the driving force pushes the film member 221. Accordingly, it is possible to allow the film member 221 to reliably proceed (send out) upon application of the pushing force.

Moreover, regarding the air-mixing slide door 14, the driving gears 26 are engaged with the gears 149a and 149b formed on the frame-shaped rigid support member 143. In this way, it is possible to constantly maintain good gear engagement compared to the case of setting relevant gear engaging portions directly on the low-rigidity aperture fringe 221a. Similarly, regarding the blower mode selection slide door 22, it is possible to maintain constant good gear engagement by enhancing rigidity with the separate reinforcing film member 223.

Moreover, since the air-circulation aperture 143 is provided in the central position in the door moving direction 'a' on the air-mixing slide door 14, performance for blending the cool air and the warm air is improved. Accordingly, it is possible to reduce unevenness in temperatures of the air entering the passenger compartment on one side (passenger side, for instance) of the vehicle compared to the temperature entering on the opposite side (driver side) of the vehicle according to the configuration layout as shown in FIG. 1.

Figure 5A:
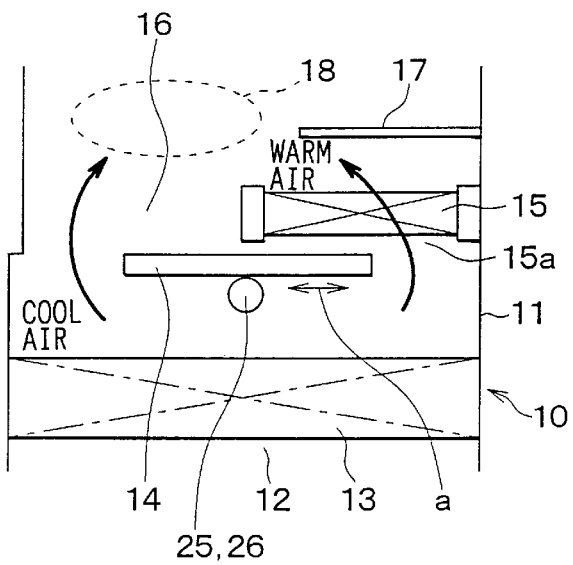
FIG. 5A is a view for explaining an operation of an air-mixing slide door according to a comparative example of the present invention.

The above effects will be explained in more detail with reference to FIGS. 5A and 5B. FIG. 5A shows a comparative example to the present invention. In FIG. 5A, since the air-mixing slide door 14 does not include the air-circulation aperture 142, the warm air via the heater core passage 15a and the cool air via the bypass passage 16 flow independently of each other at the back and front in the moving direction 'a' of the slide door 14. For this reason, the blending performance at the air-blending portion 18 suffers and unevenness in temperatures of the outgoing air in the passenger compartment becomes significant.

Figure 5B:
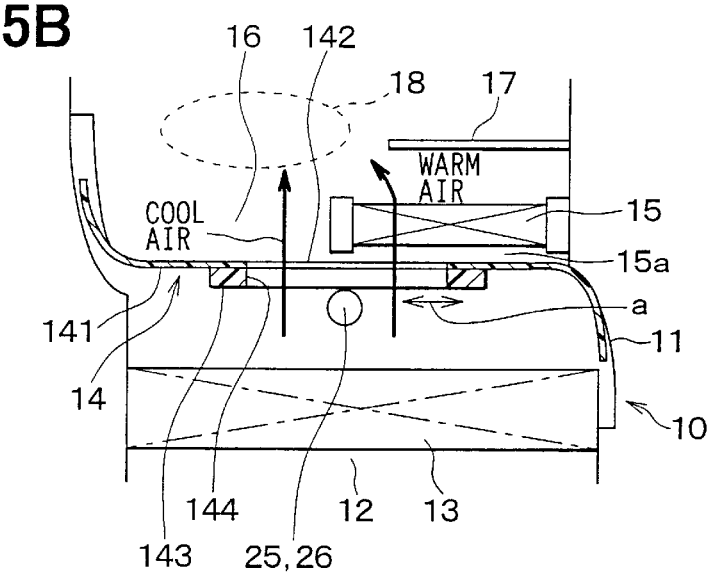
FIG. 5B is a view for explaining an operation of the air-mixing slide door according to the first embodiment.

In contrast, the air-mixing slide door 14 according to the first embodiment shown in FIG. 5B includes the air-circulation aperture 142, whereby the air-mixing slide door 14 adjusts volumetric proportions between the cool air and the warm air by means of varying an area of connection between the aperture 142 and the heater core passage 15a or between the aperture 142 and the bypass passage 16. Accordingly, the cool air and the warm air can adjacently flow in the aperture 142. Consequently, the performance for blending the cool air and the warm air is improved, whereby unevenness of the outgoing air in the passenger compartment can be reduced within a very small range of 10 degrees Celsius or less.

(Second Embodiment)

Figure 6:
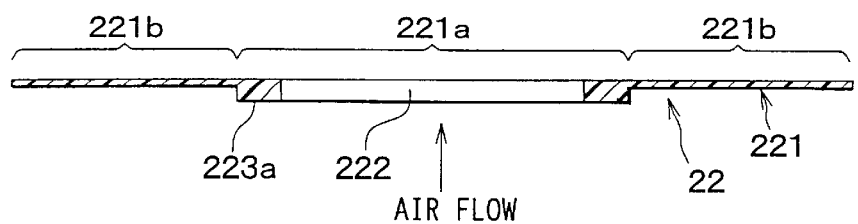
FIG. 6 is a cross-sectional view showing principal parts of a second embodiment of the present invention.

In the constitution of the blower mode selection slide door according to the first embodiment as shown in FIGS. 4A and 4B, the separate reinforcing film member 223 is adhered to the aperture fringe 221a of the film member 221. In a second embodiment, however, a reinforcing portion 223a, which corresponds to the reinforcing film member 223, is integrally formed on the film member 221 in advance as shown in FIG. 6, so that the aperture fringe 221a is formed sufficiently thicker than the film portions 221b without the aperture. In this way, it is also possible to obtain similar rigidity increasing effects similar to the effects in the slide door constitution as shown in FIGS. 4A and 4B.

(Third Embodiment)

In the first embodiment, the separate rigid support member 143 is used as the means for increasing rigidity at the aperture fringe 141a of the film member 141 of the air-mixing slide door 14, while the support member 143 is fitted to the aperture fringe 141a of the film member 141. However, it is also possible to use the separate reinforcing film member 223 in a similar manner to the film member 221 of the blower mode selection slide door 22 shown in FIGS. 4A and 4B as the means for increasing rigidity at the aperture fringe 141a of the air-mixing slide door 14. In this way, the reinforcing film member 223 may be adhered to the aperture fringe 141a of the air-mixing film member 141.

Alternatively, it is also possible to form an integral reinforcing portion on the air-mixing film member 141 in advance as the means for increasing rigidity at the aperture fringe 141a of the slide door 14. This corresponds to the reinforcing portion 223a of the film member 221 of the blower mode selection slide door 22 according to the second embodiment as shown in FIG. 6.

(Fourth Embodiment)

The separate rigid support member 143 may also be used as the means for increasing rigidity at the aperture fringe 221a of the film member 221 of the blower mode selection slide door 22, similar to the case in the air-mixing slide door 14. In this case, the support member 143 may be fitted to the aperture fringe 221a of the film member 221.

(Fifth Embodiment)

In the above-described first to fourth embodiments, the aperture fringes 141a and 221a, and the film portions 141b and 221b are integrally formed on the film members 141 and 221, respectively. Here, hole shapes of the apertures 142 and 222 are formed by die cutting. Therefore, waste materials are increased upon formation of the aperture fringes 141a and 221a due to die cutting, and the film members 141 and 221 thereby generate waste material costs.

Meanwhile, slender strip portions are provided between the plurality of apertures 142 of the film member 141. It is important to secure each of the slender strip portions with a sufficient width around the apertures in order to impart adequate strength tot he film member 141. As a result, the stripe portion narrows the apertural area of the air-circulation apertures and thereby causes an increase in resistance upon ventilation. Moreover, the slender strip portions may occasionally interfere with the wall face of the casing 11 and may cause slapping noises.

Figure 7:
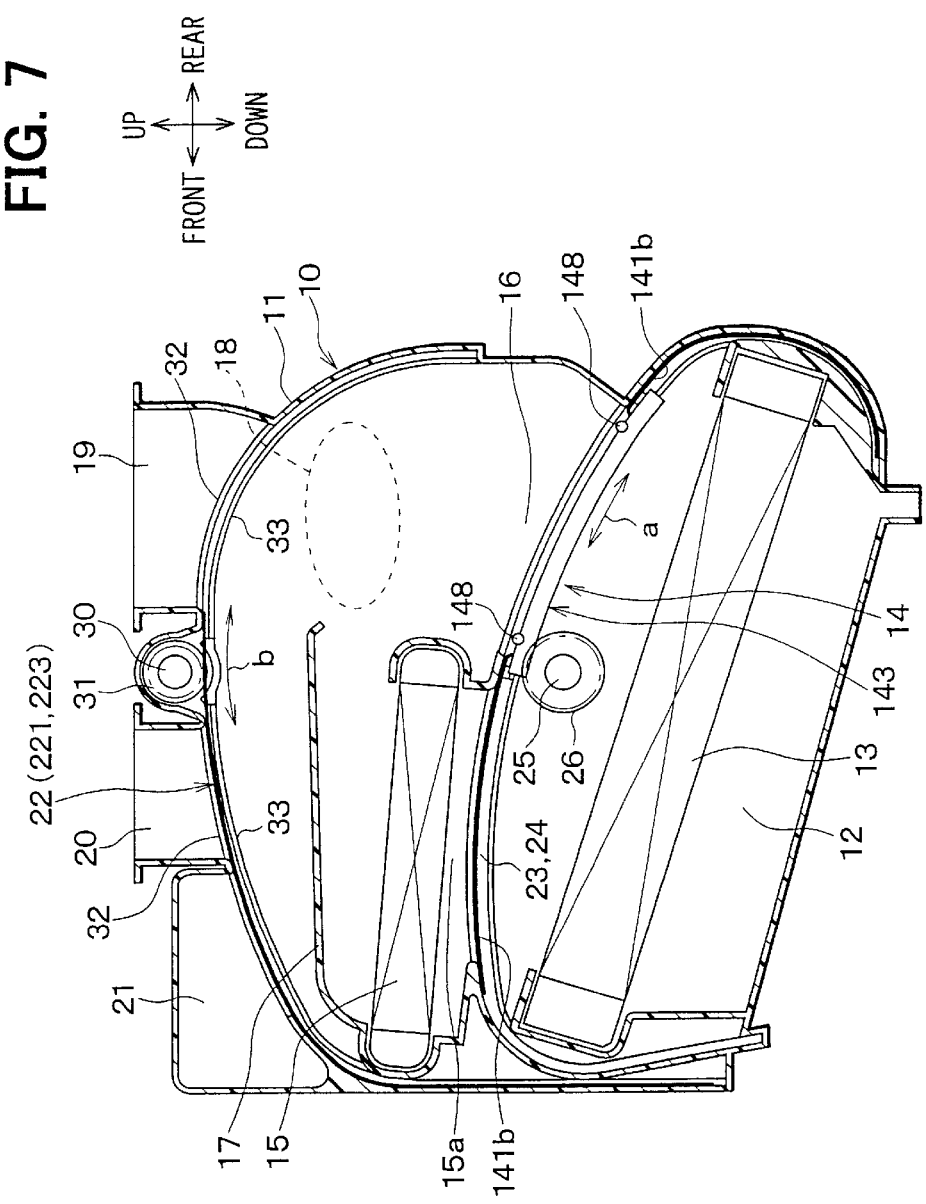
FIG. 7 is a cross-sectional view showing an entire air-conditioning unit according to a fifth embodiment of the present invention.

The fifth embodiment is intended to solve the foregoing problem. FIGS. 7 to 10 collectively illustrate the fifth embodiment, in which portions equivalent to those illustrated throughout FIGS. 1 to 6 are denoted with the same reference numerals, therefore description thereof will be omitted. FIG. 7 is a cross-sectional view showing an entire layout of an air-conditioning unit of the fifth embodiment. Unlike FIG. 1 (i.e. the first embodiment), a support member 143 of an air-mixing slide door 14 is formed into an arcuate shape along a door moving direction 'a' in FIG. 7.

Figure 8:
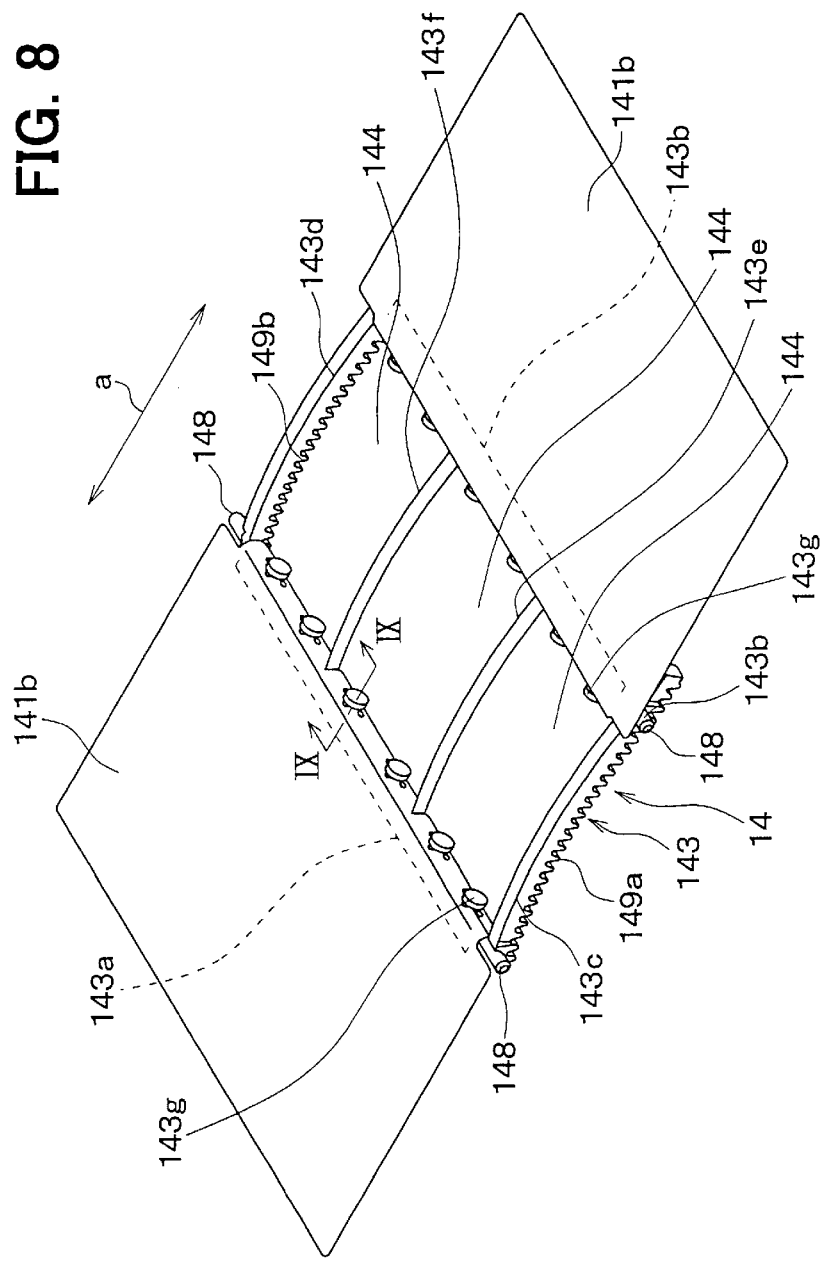
FIG. 8 is a perspective view of a single body of an air-mixing slide door according to the fifth embodiment.

FIG. 8 exemplifies a typical constitution of a single body of the air-mixing slide door 14, in which the air-circulatable support member 143 of a framed shape is disposed in a central region in the moving direction 'a' of the door 14, and film members 141b are severally joined to both front and rear ends in the door moving direction 'a' of the support member 143. Here, the film members 141b correspond to the film portions 141b without the aperture, as described in the first embodiment.

The support member 143 is a rigidly molded member made of resin such as polypropylene. Frames 143a and 143b extend perpendicularly to the door moving direction 'a'. The frames 143a and 143b are disposed parallel to each other with a given interval provided between them. They are then joined together with frames 143c and 143d that extend parallel to the door moving direction 'a'. Frames 143a and 143b are disposed near both ends, in the longitudinal directions, of the frames 143a and 143b. Therefore, frames 143a to 143d collectively constitute the rectangular frame shape.

Continuing, two reinforcing ribs 143e and 143f extending in the door moving direction 'a' are disposed, perpendicularly, at intermediate regions along the longitudinal portions of the two frames 143a and 143b. These frames 143a to 143d and the reinforcing ribs 143e and 143f are integrally formed of resin.

Spaces inside the frames 143a to 143d constitute air-circulatable apertures 144 (which correspond to the aperture 144 in FIG. 3). The apertures 144 are formed into three partitions with the reinforcing ribs 143e and 143f. Gears 149a and 149b are severally formed on lower faces of the frames 143c and 143d, which extend in the door moving direction 'a'. The gears 149a and 149b are formed so as to extend in arcuate shapes along the arcuate shapes of the frames 143c and 143d, respectively.

Columnar guide pins 148 (which correspond to the guide pins 148 in FIGS. 1 to 3) are formed on both ends in the longitudinal directions of the frames 143a and 143b, which extend perpendicularly to the door moving direction 'a'. The guide pins 148 are slidably fitted into guide grooves 23 and 24 provided on the casing as shown in FIG. 7.

Figure 9:
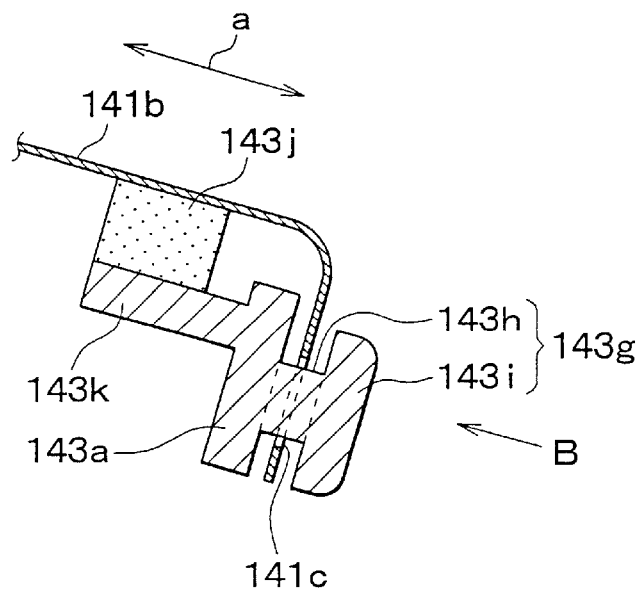
FIG. 9 is a cross-sectional view taken along line IX—IX in FIG. 8.

Moreover, a plurality of retention pins 143g (six pieces in the example of FIG. 8) are integrally formed on the frames 143a and 143b. Certain intervals are provided between the retention pins 143g along frames 143a and 143b. The retention pins 143g are disposed in regions on the frames 143a and 143b which face the apertures 144. Moreover, as shown in FIG. 9, each retention pin 143g includes a columnar spindle 143h, and a mushroom-shaped enlarged head 143i is integrally formed on a tip of the spindle 143h.

Figure 10:
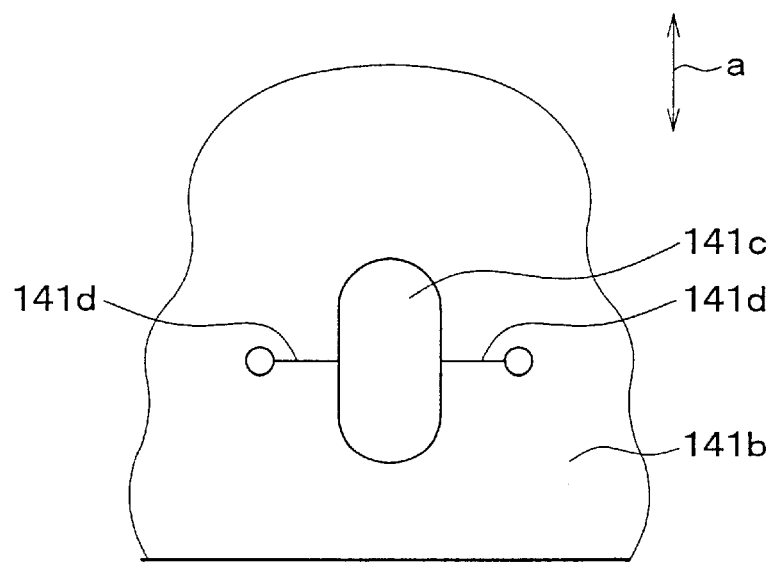
FIG. 10 is a view taken in the direction of arrow 'B' in FIG. 9.

Meanwhile, the film members 141b are made of flexible plastic films similar to the film members 141 in the first to the fourth embodiments. As shown in FIG. 10, an oval retention hole 141c is formed on a position near an edge of each film member 141b. A major-axis direction of the oval shape of the retention hole 141c is parallel to the door moving direction 'a' when each of the film members 141b is expanded. In addition, slits 141d are formed on the retention hole 141c so as to extend to right-and-left sides (along the minor axis) of the oval shape.

A major-axis diameter of the oval shape of the retention hole 141c is made larger than a diameter of the enlarged head 143i of the retention pin 143g. On the contrary, a minor-axis diameter of the oval shape of the retention hole 141c is made smaller than the diameter of the enlarged head 143i of the retention pin 143g but equal to or larger than a diameter of the spindle 143h of the retention pin 143g. Accordingly, upon fitting the retention hole 141c of the film member 141b into the retention pin 143g, the enlarged head 143i of the retention pin 143g can be inserted into the retention hole 141c by opening the slits 141d. Then, after the enlarged head 143i passes through the retention hole 141c, the slits 141d are automatically closed by the resilience of the film member. In this way, it is possible to retain the enlarged head 143i reliably through the retention hole 141c, and to appropriately join the film members 141b to the frame-shaped support member 143 appropriately.

Here, since the major-axis diameter of the oval shape of the retention pin 141c is larger than the diameter of the spindle 143h of the retention pin 143g, the film members 141b are joined to the support member and are movable to some extent in the major-axis direction of the oval shape of the retention pin 141c, i.e. in the door moving direction 'a'.

Additionally, as shown in FIG. 9, a support surface 143k for supporting an elastic member 143j is integrally formed on the frame 143a of the support member 143, and the elastic member 143j is fixed on the support surface 143k by adhesion or the like. The elastic member 143j presses the film member 141b onto a sealing surface on the casing 11 by spontaneous resilience of the elastic member 143j and thereby enhances a sealing effect of the film member 141b. Although FIG. 9 only illustrates the constitution of the frame 143a, the support surface 143k and the elastic members 143j are similarly provided on the other frame 143b.

According to the fifth embodiment, the air-circulation apertures 144 are formed with the frame-shaped rigid support member 143, and the film members 141 are joined to the ends of the support member 143. Therefore, it is not necessary to provide the film members 141b in the regions for the apertures 144. Hence, waste materials are not produced upon formation of the film members 141b because die cutting does not take place. Therefore, it is possible to reduce material costs for the film members 141b.

Moreover, the film members 141b are not disposed in the regions for the apertures 144 and the film members 141b are pressed by the elastic member 143 onto the sealing surfaces on the casing 11 in the positions near the frames 143a and 143b of the support member 143. Accordingly, it is possible to avoid the problem of slapping noises because the film members 141b do not interfere or collide with the rigid support member 143 or the sealing surfaces on the casing 11.

Furthermore, the retention hole 141c of the closed oval shape and the slits 141d are provided on each end of the film member 141b, and the retention hole 141c is fitted to and retained on the enlarged head 143i of the retention pin 143g on the support member 143. In this way, the retention hole 141c can be securely retained on the enlarged head 143i of the retention pin 143g. Therefore, the ends of the film members 141b do not separate from the support member 143.

Meanwhile, when the apertures 142 (see FIG. 2A) are provided in the central position of the single film member 141 as described in the first embodiment, it is necessary to provide sufficiently wide (about 20 mm, for example) strip portions between the plurality of apertures 142 in order to secure sufficient strength for the film member 141. However, such strip portions narrow the apertural area of the plurality of apertures 142 which increases ventilation resistance.

In contrast, according to the fifth embodiment, the air-circulation apertures 144 are formed in the rigid support member 143. Therefore, it is possible to reduce the width of each reinforcing rib 143e or 143f down to approximately 4 to 5 mm, for example. Hence, it is possible to increase the apertural area as compared to the first embodiment, and the ventilation resistance can be thereby reduced.

(Other Embodiments)

In any of the first to the fourth embodiments, it is also possible to form the support member 143 or the reinforcing film member 223 into an arcuate shape along the door moving direction 'a' or 'b' as similar to the fifth embodiment. Otherwise, a lattice shape may be integrally formed on the air-circulation aperture 142 or 222 in order to increase rigidity (strength) of the film member 141 or 221.

In the fifth embodiment, the air-mixing slide door 14 is composed of the air-circulatable rigid support member 143 of the frame shape and the film members 141b joined to the ends of the support member 143. Here, the blower mode selection slide door may be composed of the support member 143 and the film members 141b, similar to the air-mixing slide door 14.

Another variation based on the fifth embodiment is to form the retention pin 143g of the support member 143 only with the columnar spindle 143h and without the enlarged head 143h on the tip. Continuing, the retention hole 141c on the end of the film member 141b is formed into a circular shape to be fitted to the columnar spindle 143h, and the slits 141d are eliminated. However, instead, an enlarged head of a mushroom shape may be formed by means of heat caulking after the circular retention hole 141c is fitted to the columnar spindle 143h. Therefore, the retention hole 141c of the film member 141b will not separate from the retention pin 143g. This mode can eliminate the slits 141d of the film members 141b. Accordingly, it is possible to increase rigidity of the film members 141b.

In the fifth embodiment, the retention pin 143g is formed to protrude from an inner region of the frame shape of the support member 143 toward the aperture 144. Instead, it is also possible to form the retention pin 143g to protrude from an outer region of the frame shape of the support member 143 outward, so that the end of the film member 141b may be joined to the retention pin 143g located outside the frame shape.

Moreover, in the fifth embodiment, the film member 141b is joined to an edge of the frame-shaped rigid support member 143 by way of the mechanical retention structure composed of the retention pin 143g and the retention hole 141c. Here, the retention pins 143g and the retention holes 141c may be eliminated. Instead, the film member 141b may be directly fixed to the edge of the support member 143 by means of adhesion or heat welding.

Furthermore, in the fifth embodiment, the elastic member 143j, which is separate from the support member 143, is provided on the support surface 143k of the frame-shaped rigid support member 143 in order to enhance the sealing effect of the film member 141b by means of pressing the film member 141b onto the sealing surface on the casing 11 with resilience of the elastic member 143j. Here, it is also possible to form a rubber elastic member such as elastomeric rubber integrally upon formation of the plastic support member 143, so that the rubber elastic member exerts a force pressing the film member 141b onto the sealing surface on the casing 11 similar to the above-mentioned separate elastic member 143j. In addition, it is also possible to eliminate the elastic member 143j, if the slide door 14 is precisely fabricated by reducing dimensional errors such that the film member 141b is accurately pressed onto the sealing plate on the casing 11.

The fifth embodiment has not particularly explained a relation between sizes of the two film members 141b to be disposed on both front and rear ends in the door moving direction 'a' of the support member 143. If both film members 141b on the front and rear ends are formed of the same size, then it is possible to avoid erroneous setting of the film members 141b. Practically, such an arrangement is advantageous.

Meanwhile, it is also possible to change the sizes of the film members 141b on the front and rear sides depending on aspects of an applicable ventilation controlling apparatus. Otherwise, it is possible to join the film member 141b to only one side of the front and rear sides in the door moving direction 'a', of the support member 143.

It is to be understood that the present invention is not only limited to ventilation control in an automotive air-conditioning system, but it is also widely applicable to non-automotive ventilation control systems. Additionally, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A ventilation controlling apparatus comprising:

a casing for forming an air passage; and a slide door movably disposed inside the casing, wherein the slide door includes a frame-shaped rigid support member provided with an air-circulatable aperture, and a film member joined to an edge of the support member, and the support member is moved integrally with the film member by applying door-controlling force to the support member.

2. The ventilation controlling apparatus according to claim 1, wherein there are two film members and the film members are joined to both a leading and trailing end with respect to a moving direction of the support member.

3. The ventilation controlling apparatus according to claim 2, wherein the film members are identical in shape.

4. The ventilation controlling apparatus according to claim 1, wherein the support member includes a retention pin, the film member defines a retention hole to be retained by the retention pin, and the film member is joined to the support member by retaining the retention pin in the retention hole.

5. The ventilation controlling apparatus according to claim 3, wherein the support member includes a retention pin, the film member defines a retention hole to be retained by the retention pin, and the film member is joined to the support member by retaining the retention pin in the retention hole.

6. An automotive air-conditioning system comprising:

a heater core for heating air to flow into a passenger compartment;

a bypass passage for allowing the air to bypass the heater core;

an air-mix door for adjusting proportions between a first volume of air passing through the heater core and a second volume of air passing through the bypass passage, the air-mix door further including;

a frame-shaped rigid support member provided with an aperture to permit air to pass;

a film member joined around an edge of the support member, wherein the support member moves integrally with the film member; and a gear driven by a shaft, wherein the gear drives the air-mix door.

* * * * *